Feb. 18, 1958

C. J. CISLO 2,823,556

STEERING COLUMN ASSEMBLY

Filed Oct. 12, 1956

INVENTOR.
Casimer J. Cislo
BY
S. C. Thorpe
ATTORNEY.

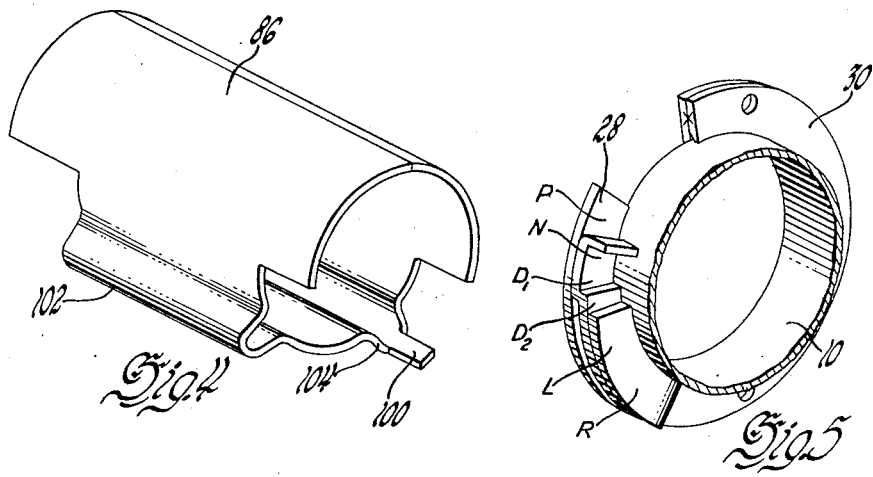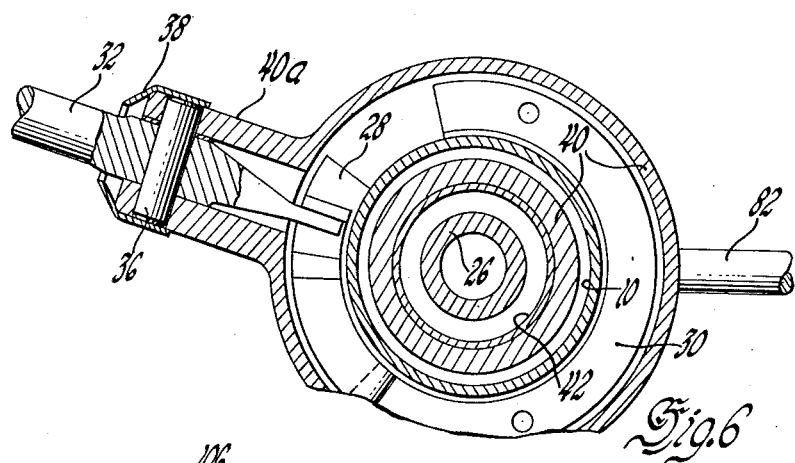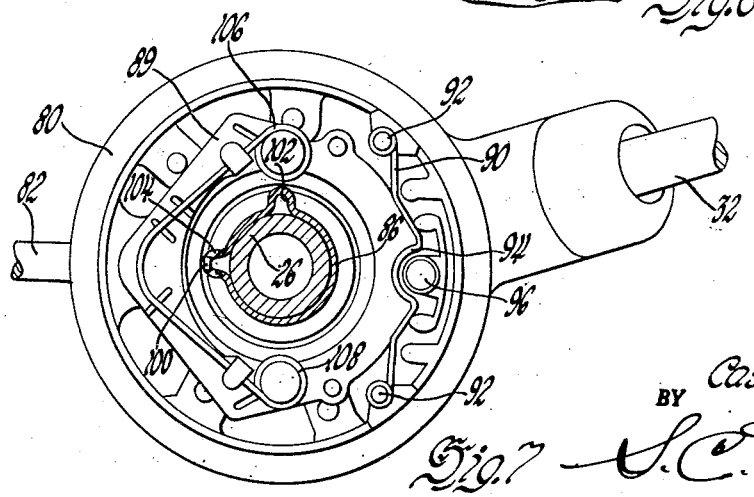

United States Patent Office 2,823,556
Patented Feb. 18, 1958

2,823,556

STEERING COLUMN ASSEMBLY

Casimer J. Cislo, Detroit, Mich., assignor to General Motors Corporation, Detroit, Mich., a corporation of Delaware Application October 12, 1956, Serial No. 615,577

4 Claims. (Cl. 74—492)

This invention relates to a steering column assembly and has for its principal object to provide such an assembly which enables desirable economies in the manufacture of the component parts, the fabrication of the assembly and the installation thereof in the vehicle.

Having regard to the assembly which the instant assembly is designed to replace, the economies afforded hereby result substantially from the changed relative relationship of some of the components. Also certain parts have been simplified and/or rendered multi-functional.

One of the more significant benefits provided by the invention resides in the fact that whereas in the final assembly of passenger cars it has always been necessary heretofore to install the steering column assembly in the chassis before the body drop, it is now possible (at least where the steering shaft is bi-sectional—see, for example, Burton 2,753,848) to install the assembly in the body before the body and chassis are joined. This markedly speeds up the final assembly line, since there is no longer a bottle neck at the body drop station.

The invention will be particularly described with reference to the accompanying drawings wherein:

Figs. 4 and 5 are perspective views of two parts;

Fig. 6 is a section on the line 6—6 in Fig. 2; and

Fig. 7 is a plan of the signal switch mechanism comprised in the assembly.

Figure 1:
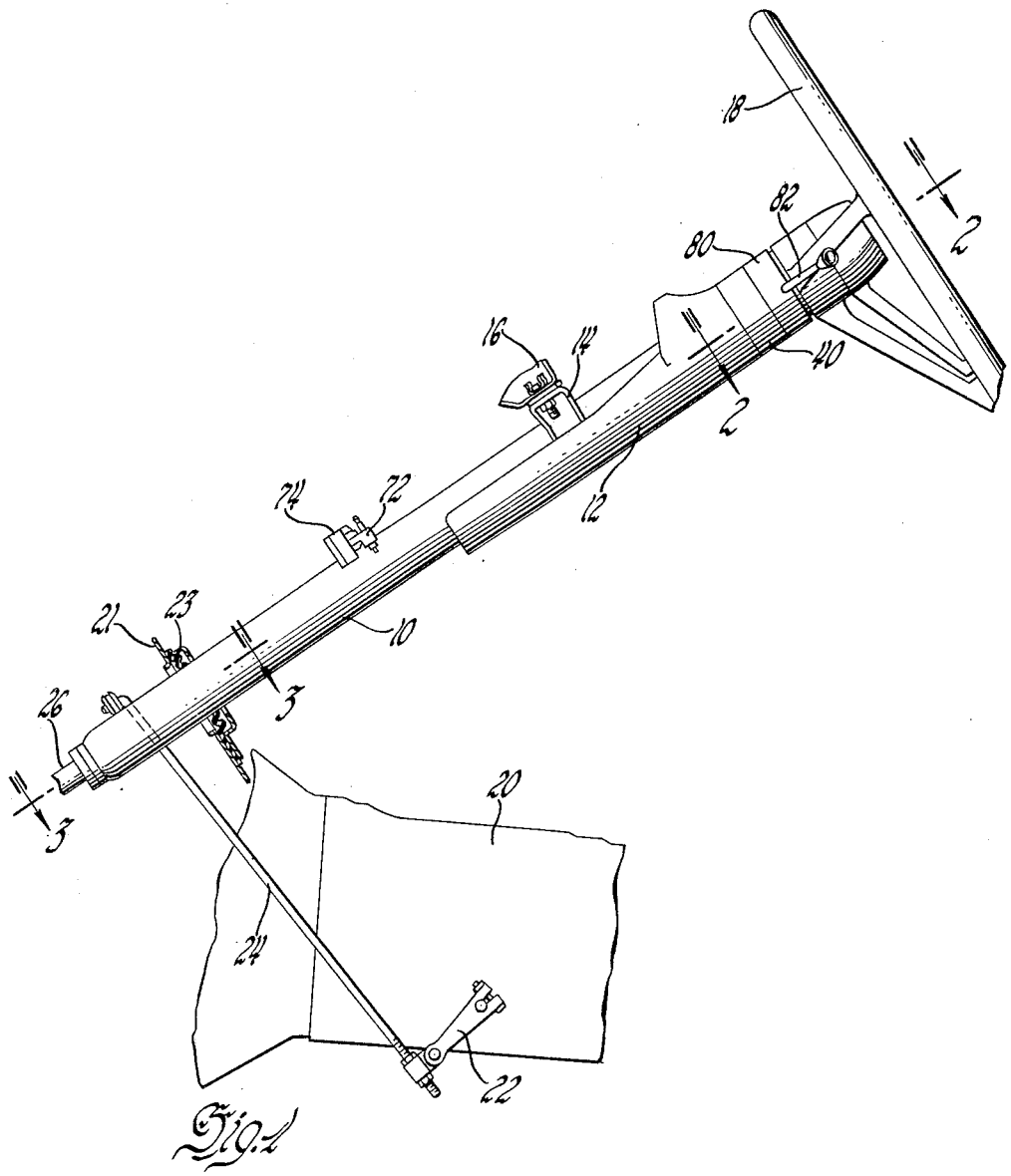
Fig. 1 shows the steering column assembly in side elevation.

Referring first to Fig. 1, the numeral 10 denotes a steering column having an ornamental jacket 12 therearound. Such jacket is fixedly connected to a bracket 14 through which the steering column is secured to the dash panel 16. At the upper end of the assembly will be seen the usual steering wheel 18.

A portion of the vehicle transmission is shown at 20 below the steering column assembly. Arm 22 and link 24 are transmission control members and will be later referred to. An automatic transmission is assumed. The steering shaft 26 will be noted extending from the lower end of the column 10 beneath the toe board 21. Boot 23 allows for some lateral misalignment of the assembly.

Figure 2:
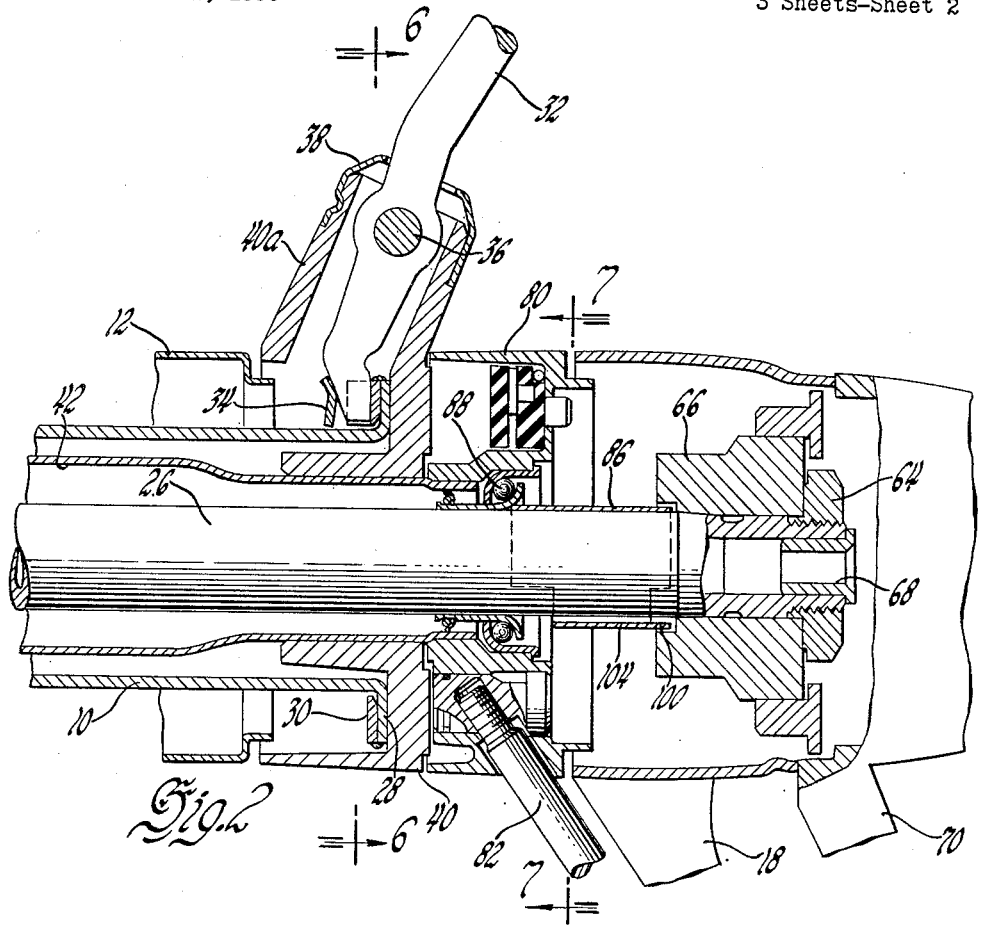
Fig. 2 is a fragmentary, longitudinal sectional view on the line 2—2 in Fig. 1.

Column 10 terminates at its upper end (Fig. 2) in a flange 28 having welded thereto a stop member 30 functional with relation to a transmission control lever 32 which is maintained in engagement with the stop member by a spring 34.

Figure 3:
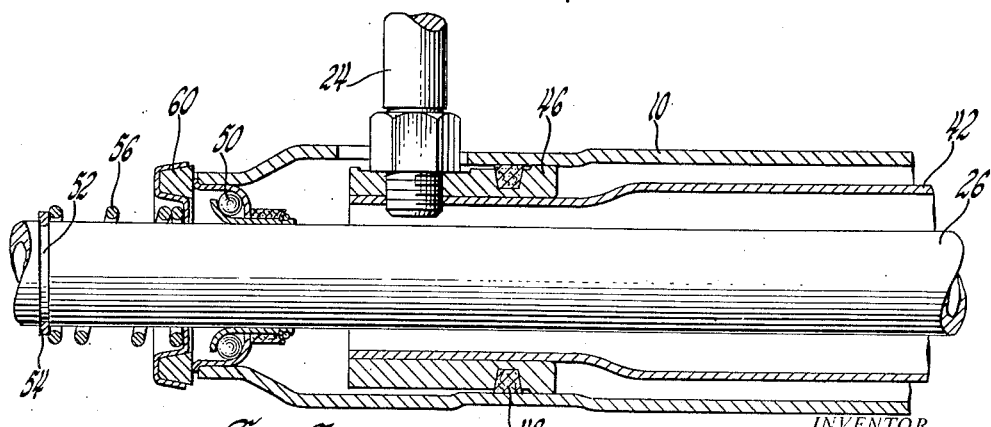
Fig. 3 is a sectional view on the line 3—3 in Fig. 1.

Lever 32 is pivoted on a pin 36 retained in position by a cup-like element 38 snap-fitted over the boss portion 40a of a carrier 40 for the lever. This carrier is welded or otherwise fixedly secured to a transmission control tube 42 which is connected, as shown in Fig. 3, to the previously mentioned link 24. Bushing 46 in which the tube 42 turns is annularly recessed to accommodate a seal 48. Below or to the left of the bushing is a lower bearing 50 for the steering shaft 26. The latter will be seen as recessed at 52 to accommodate a snap ring 54 abutted by a spring 56. The purpose of the spring is to preload all of the bearing surfaces thereabove before final assembly of the vehicle and to securely position the seal 60. Additionally, the spring operates to absorb or compensate for the cumulative effect of tolerances permitted in the fabrication of the several parts of the assembly.

Reverting to the upper portion of the steering column assembly, a nut 64 is threaded on the end of the steering shaft 26 to secure the hub 66 of the steering wheel 18 to the shaft. Element 68, press-fitted into the end of the steering shaft, insulates electrical switch elements (not shown) which become engaged on manipulation of the horn ring 70. A lead connected to one of these elements extends downwardly through the column to a horn contact assembly 72 integrated with a second assembly 74, later to be herein referred to, comprising a neutral safety switch and a back-up lamp switch. Steering shaft 26 is preferably provided with a groove, not shown, for accommodating the electrical lead.

It should be clear that movement of the lever 32 in either direction induces rotation of the tubular shaft 42 which, as previously stated, is fixedly secured to the carrier 40. Lever 32 in the case of the particular transmission has six operative positions, namely, "Park," "Neutral," first and second "Drive" positions, "Low" and "Reverse." In Fig. 5 showing in detail the stop member 30 for the lever, these several positions are indicated.

Tubular shaft 42 carries cam means in the area of the assembly 74 in order that the two switches therein comprised will be suitably actuated. Thus, when the lever 32 is placed in "Reverse" position, the back-up light switch is closed to light the lamps at the rear of the vehicle. The neutral safety switch is circuited to the ignition switch and, as well known, its purpose is to prevent operation of the starter motor when the transmission control lever is in any position other than "Neutral" or "Park." Accordingly, the camming of the shaft 42 is so designed that the safety switch is closed only when the lever 32 is in one of the two positions indicated. It is not considered that any really detailed description of the switch assembly and the involved circuitry is necessary since the same are old in the art and fully understood by those skilled therein.

Disposed just upwardly of the carrier 40 is a turn signal switch unit 80 including an actuating lever 82. This assembly is described in detail in the co-pending application of William E. Brown and Ward Cole, Serial No. 444,068, filed July 19, 1954. In view of the completeness of such description, little need be said about the construction and operation of the unit here. However, it should be pointed out that there is here employed in lieu of the cancelling means shown in the identified application an element 86 which, in addition to its cancelling function, serves as a spacer between the hub 66 and the upper steering shaft bearing 88 encircled by the body of the signal switch unit.

The signal switch assembly further differs from the construction of the Brown-Cole application in that, instead of the means therein shown for yieldingly maintaining the operating ring 89 (Fig. 7) in selected position, there is employed a spring member 90 suitably anchored at either end to a post 92 fixed to the assembly body. The spring 90 is indented or distorted at 94 to accommodate a roller-carrying pin 96 which moves with the operating ring 89 as the same is rotated by the lever 82 to indicate a turn.

Returning now to the multi-functional element 86, it will be seen that the same comprises a tang 100 which serves as a key whereby the element is connected to the steering wheel hub 66 to rotate therewith. In addition, the element 86 is formed to provide ridges 102 and 104, each of which is adapted to engage one of the pawls 106 and 108 in the operation of the signal switch assembly. As brought out in the previously filed application, the use of wire coils as pawls prevents damage to any of the parts of the unit should the control lever 82 be deliberately or accidentally held in the turned position through the cancelling cycle.

In the aforepart hereof reference is made to the body drop operation in final assembly, it being noted that the steering column assembly is installed in the body before the latter is bolted or otherwise secured to the chassis. Previously, with the steering column assembly installed in the chassis, much juggling was required because of the steering column assembly to place the body in proper relation to the chassis. Now, with the steering column assembly carried by the body at the time of the drop, relatively little manipulation of the body is necessary to place the same in the required position. Moreover, the worker at the station has none of the difficulty, experienced before, in effecting joining of the steering shaft and the steering member it directly controls or in properly relating the assembly to the involved structural parts, since the assembly is readily manually movable longitudinally, and to a substantial extent laterally, as a unit. It should be noted that the connection 14, 16 is not made until the steering shaft has been properly located and connected up, a special fixture being employed to temporarily hold the assembly in position in the body. Alternatively, the connection to the dash panel may be initially made loosely so as to allow for the degree of play required in the final assembly operation.

I claim:

1. A steering column assembly including a mast jacket, a shaft confined by said mast jacket for controlling a transmission actuating element extending through an opening in said jacket, manually-operated means for rotating said shaft, said last means being positioned in spaced relation to said actuating element, stop means supported by said jacket and engaged by a portion of said manually-operated means, a steering shaft within said jacket having a steering wheel at the upper end thereof, a turn signal switch mechanism above said manually-operated means, a spacer between said signal switch mechanism and the hub of said steering wheel, said spacer being connected to said hub to turn therewith and serving as a cancelling member in the operation of said signal switch mechanism, and means below said jacket and backed by said steering shaft operating to load bearing surfaces comprised in the assembly.

2. A steering column assembly including a mast jacket, a shaft confined by said mast jacket for controlling a transmission actuating element extending through an opening in said jacket, manually-operated means for rotating said shaft, said last means being positioned in spaced relation to said actuating element, stop means supported by said jacket and engaged by a portion of said manually-operated means, a steering shaft within said jacket having a steering wheel at the upper end thereof, a turn signal switch mechanism above said manually-operated means, a spacer above said signal switch mechanism and connected through an integral tang to the hub of said steering wheel to turn therewith, said spacer having generally the form of a cylinder flattened at one side to provide a pair of ridges from one of which said tang extends, said ridges serving as cancelling members in the operation of said signal switch mechanism, and means below said jacket and backed by said steering shaft operating to load bearing surfaces comprised in the assembly.

3. A steering column assembly including a mast jacket adapted for connection to a vehicle body member, said jacket having an opening therein near its lower end and a second opening mediate the ends thereof, switch means mounted over said second opening, a tubular shaft within said mast jacket adapted to actuate said switch means, a transmission control member extending through said first opening for connection to said tubular shaft, manually-operated transmission control means fixed to said tubular shaft near the upper end thereof, said last means having a portion encircling said mast jacket, stop means on said mast jacket engaged by a portion of said manually-operated transmission control means, a steering shaft encircled by said tubular shaft and carrying a steering wheel at the upper end thereof, a signal switch assembly mediate said encircling portion of said manually-operated transmission control means and the hub of said steering wheel, a spacer between said signal switch assembly and said hub, said spacer being connected to said steering shaft to turn therewith and serving as a cancelling member in the operation of said signal switch assembly, and spring means below said mast jacket backed by means carried by said steering shaft outwardly of said jacket and operating to load bearing surfaces comprised in the assembly.

4. A steering column assembly including a mast jacket adapted for connection to a vehicle body member, said jacket having an opening therein near its lower end and a second opening mediate the ends thereof, switch means mounted over said second opening, a tubular shaft within said mast jacket adapted to actuate said switch means, a transmission control member extending through said first opening for connection to said tubular shaft, manually-operated transmission control means fixed to said tubular shaft near the upper end thereof, said last means having a portion encircling said mast jacket, stop means on said mast jacket engaged by a portion of said manually-operated transmission control means, a steering shaft encircled by said tubular shaft and carrying a steering wheel at the upper end thereof, a signal switch assembly mediate said encircling portion of said manually-operated transmission control means and the hub of said steering wheel, a spacer above said signal switch mechanism and connected through an integral tang to the hub of said steering wheel to turn therewith, said spacer having generally the form of a cylinder flattened at one side to provide a pair of ridges from one of which said tang extends, said ridges serving as cancelling members in the operation of said signal switch mechanism, and spring means below said mast jacket backed by means carried by said steering shaft outwardly of said jacket and operating to load bearing surfaces comprised in the assembly.

No references cited.